United States Patent
Smith

(12) 
(10) Patent No.: US 6,785,061 B2
(45) Date of Patent: Aug. 31, 2004

(54) CONVERGING AIR LENS STRUCTURES

(75) Inventor: George E. Smith, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/302,011

(22) Filed: Nov. 21, 2002

(65) Prior Publication Data

US 2004/0100701 A1 May 27, 2004

(51) Int. Cl.[7] .............................. G02B 9/00; G02B 3/12

(52) U.S. Cl. ..................... 359/796; 359/666; 359/739

(58) Field of Search ............................... 359/665–668, 359/796, 739, 740

(56) References Cited

U.S. PATENT DOCUMENTS

| | | | | |
|---|---|---|---|---|
| 4,721,373 A | * | 1/1988 | Sugiyama | 359/796 |
| 5,272,568 A | * | 12/1993 | DeJager | 359/758 |
| 5,274,503 A | * | 12/1993 | DeJager | 359/657 |
| 5,808,808 A | * | 9/1998 | Yamanashi | 359/682 |
| 6,473,238 B1 | * | 10/2002 | Daniell | 359/622 |

* cited by examiner

*Primary Examiner*—Georgia Epps
*Assistant Examiner*—M. Hasan

(57) ABSTRACT

Converging air lens structure includes a first refractive medium that has a first index of refraction. A second refractive medium that has a second index of refraction is immersed in the first refractive medium. The second refractive index is less than the first index of refraction. The lens structure features converging lens properties. An aperture stop is disposed in the second refractive medium, which is preferably air.

20 Claims, 5 Drawing Sheets

CONVERGING AIR LENS STRUCTURES

FIELD OF THE INVENTION

The present invention relates generally to converging lens structures, and more particularly, to converging air lens structures.

BACKGROUND OF THE INVENTION

Converging lenses that are formed in glass or plastics are well known. Furthermore, the use of such a lens to relay an image in air (or vacuum) is very common.

Designers often use the so-called "Gaussian" lens formula for the paraxial behavior of such a lens:

$$1/f = 1/s + 1/s''$$

where (s) is the object distance from the lens, (s") is the image distance from the lens, and (f) is the focal length of the lens.

For thin lenses in air for which this formula is valid, it is also known that the focal length is related to the (thin) lens parameters by the following equation:

$$1/f = (n-1)(1/r1 - 1/r2)$$

where (r1) is the first surface radius of curvature, (r2) is the second surface radius of curvature, and (n) is the refractive index of the lens material (typically 1.5).

With practical lenses, it is not often true that the lens can be considered 'thin' so it is usually required to take the real central thickness of the lens into account.

The focal length formula then becomes:

$$1/f = (n-1)(1/r1 - 1/r2) + (n-1)2/n*(tc/(r1\ r2))$$

where (tc) is the lens central thickness.

In imaging systems, particularly those which are intended to image a significant angular field of view, it is necessary to provide an aperture stop to limit the rays which can propagate through the lens, and to control certain aberrations of the off-axis images, such as coma, astigmatism, distortion and field curvature.

Systems, which have two groups of elements about a centrally located stop, are quite beneficial for such wider field imaging. Certain lenses are known where a single thick lens can provide good wide-angle imaging provided the lens contains an aperture stop imbedded in the lens material.

A classical example of this type of lens is the Coddington magnifier. The Coddington magnifier is often used as a postage stamp magnifier. This lens is formed from a complete sphere of glass with a small aperture stop located at the center of the sphere. The lens is very thick with the radii being equal and opposite, and with the thickness being twice the radius of curvature. In practice, the sphere is reduced to a cylinder with spherical end caps. Then, a groove is ground into the central plane to form an aperture stop. Thereafter, the groove is painted with a black paint, for example. FIG. 5 illustrates a cross section of a prior art Coddington magnifier lens.

Unfortunately, the Coddington Magnifier lens is difficult to manufacture and produce in large quantities. Furthermore, internal aperture stops can be molded into plastic lenses, but it is generally inconvenient to use an internal stop even though there may be optical benefits to doing so. For example, molding an internal stop in a plastic part requires the insertion into the mold of a metal shim part containing the stop. This procedure would normally be a manual type process step, which is not desirable from a manufacturing standpoint. Alternatively, an expensive automation would be required to insert the stop element every time a mold is opened, and a new shot run.

Also the different coefficient of expansion of metals and plastics can result in built in strain in the material and the possibility of subsequent delamination.

Accordingly, it is desirable to have a lens structure that has an embedded stop that enables improved wide field imaging without the manufacturing difficulties and other negative effects of prior art lens structures with embedded stops described previously.

Based on the foregoing, there remains a need for a lens that overcomes the disadvantages set forth previously.

SUMMARY OF THE INVENTION

According to one embodiment of the present invention, converging air lens structures are described. The converging air lens structures include a first refractive medium that has a first index of refraction. A second refractive medium that has a second index of refraction is immersed in the first refractive medium. The second refractive index is less than the first index of refraction. The lens structure features converging lens properties. An aperture stop is disposed in the second refractive medium, which is preferably air.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
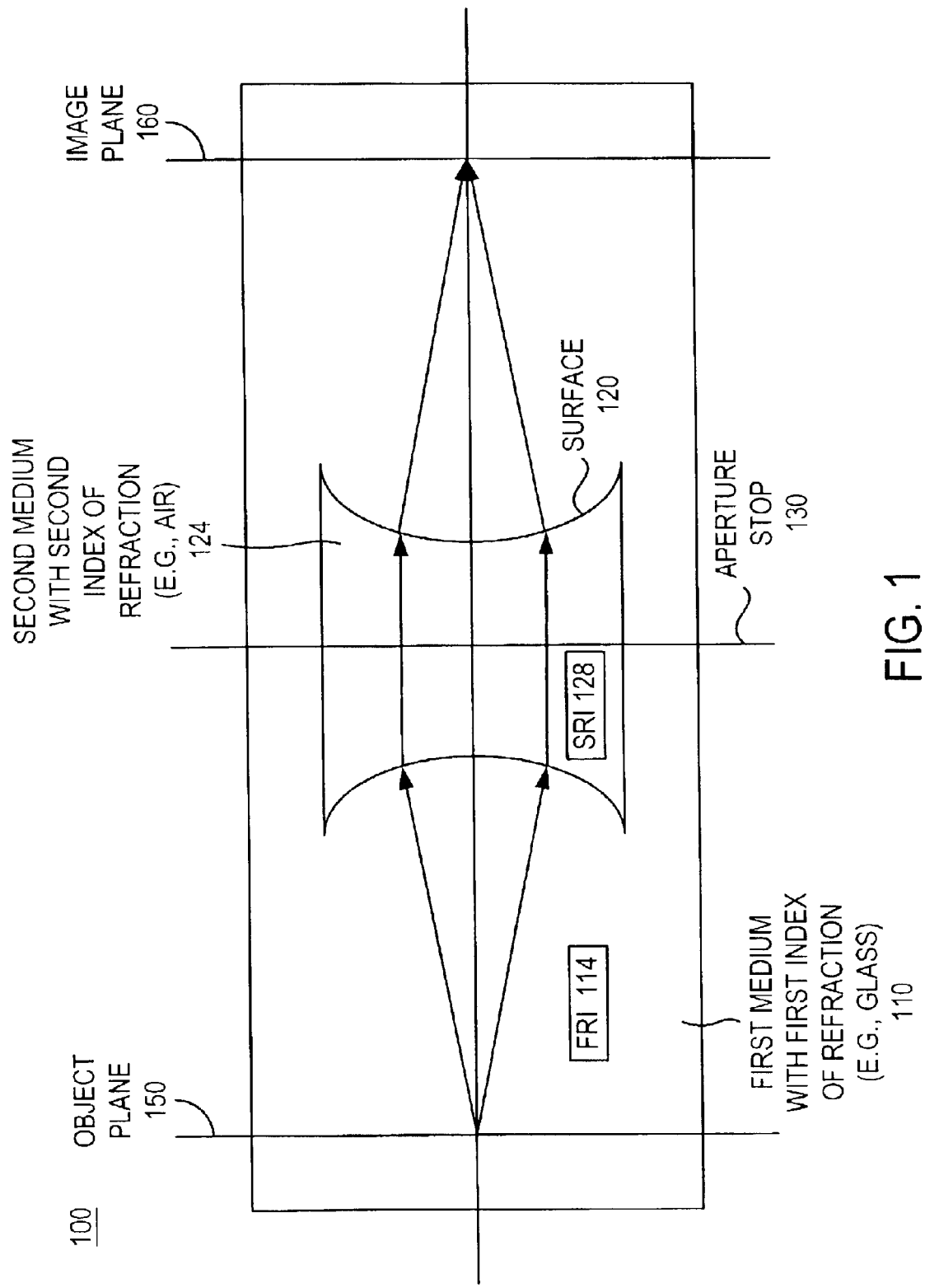
FIG. 1 illustrates a lens structure according to one embodiment of the present invention in which the first refractive medium is manufactured as a single piece.

Converging air lens structures are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Converging (Inverted) Air Lens Structure

The equation set forth in the Background for the focal length of a thick lens is a special case of a more general equation in which the media to the left and the right of the lens may have some values other than 1.0 for media that is different from air or vacuum.

The general form of the Gaussian lens equation for arbitrary media is as follows:

$$n/s + n''/s'' = (n'-n)/r1 + (n''-n')/r2 - tc(n'-n)(n''-n')/(n' \; r1 \; r2).$$

where the first surface of radius (r1) is separating a first medium of refractive index (n) from a second medium of refractive index (n') and the second surface of radius (r2) is separating the second medium (n') from a third medium of refractive index (n").

For example, the above equation can be used for a case where the lens forms a window between air and water. In this case, the index (n') of the glass of about 1.5 is higher than both the refractive index (n) for air (n=1.0), and the refractive index (n") for water (e.g., n=1.33).

However, this paraxial equation is generally true for any combination of media with different refraction indices. One aspect of the invention is to consider the case in which (n) and (n") are once again the sane, but both are higher than (n').

In one embodiment, the lens structure according to the invention is a bubble of air inside glass or molded plastic. By employing the general equation above, it is noted that the terms (n'−n) and (n"−n') are both reversed in sign from a typical case, where (n') is the highest index, such as a simple glass lens in air.

It is also noted that the focal length of the lens has changed sign from the typical case. However, according to the invention the sign is reversed again by simply changing the sign of the radius of curvatures of the two surfaces, thereby realizing a converging lens.

In this embodiment, a biconcave low index 'lens' that is immersed in a higher index medium and that behaves like a converging lens is realized. According to the invention, a converging lens is built out of air that is contained inside another medium with a higher index of refraction. In this regard, the lens structure according to the invention is referred to herein as "converging air lens" or "inverted air lens."

Both the object plane and image plane can be disposed the medium with a higher index of refraction. This lens system features an internal aperture stop that is disposed in air. The lens structure according to one embodiment of the invention can be a hole in a metal shim, for example.

Air Lens Structure 100

FIG. 1 illustrates a converging air lens structure 100 according to one embodiment of the present invention. In this embodiment of the present invention, the lens structure 100 is manufactured as a single piece. The lens structure 100 includes a first medium 110 that has a first refractive index 114 (e.g., n=1.5) and a second medium 124 that has a second refractive index 128 (e.g., n=1.0). The lens structure 100 includes an object plane 150 and an image plane 160.

In one embodiment, the first surface 120 forms an "air" lens. For example, the "air" lens may be formed within the first medium 110. In this manner, an aperture stop 130 (e.g., an embedded or internal aperture stop) may be disposed in air according to the invention. Disposing the aperture stop 130 in air is cost effective and relatively easy to manufacture as compared to attempting to embed an aperture stop in another medium, such as glass. The lens structure with an aperture stop disposed in air is referred to herein as an "air" lens structure.

One aspect according to the invention is the placement of an aperture stop in the second refractive medium that has a refractive index of 1.0. In other words, the lens structure according to the invention has an aperture stop plane that is disposed in air. The aperture stop plane is referred to herein as an "internal aperture stop," an "embedded aperture stop" or simply as "internal stop" or "embedded stop".

Air Lens Structure 200

Figure 2:
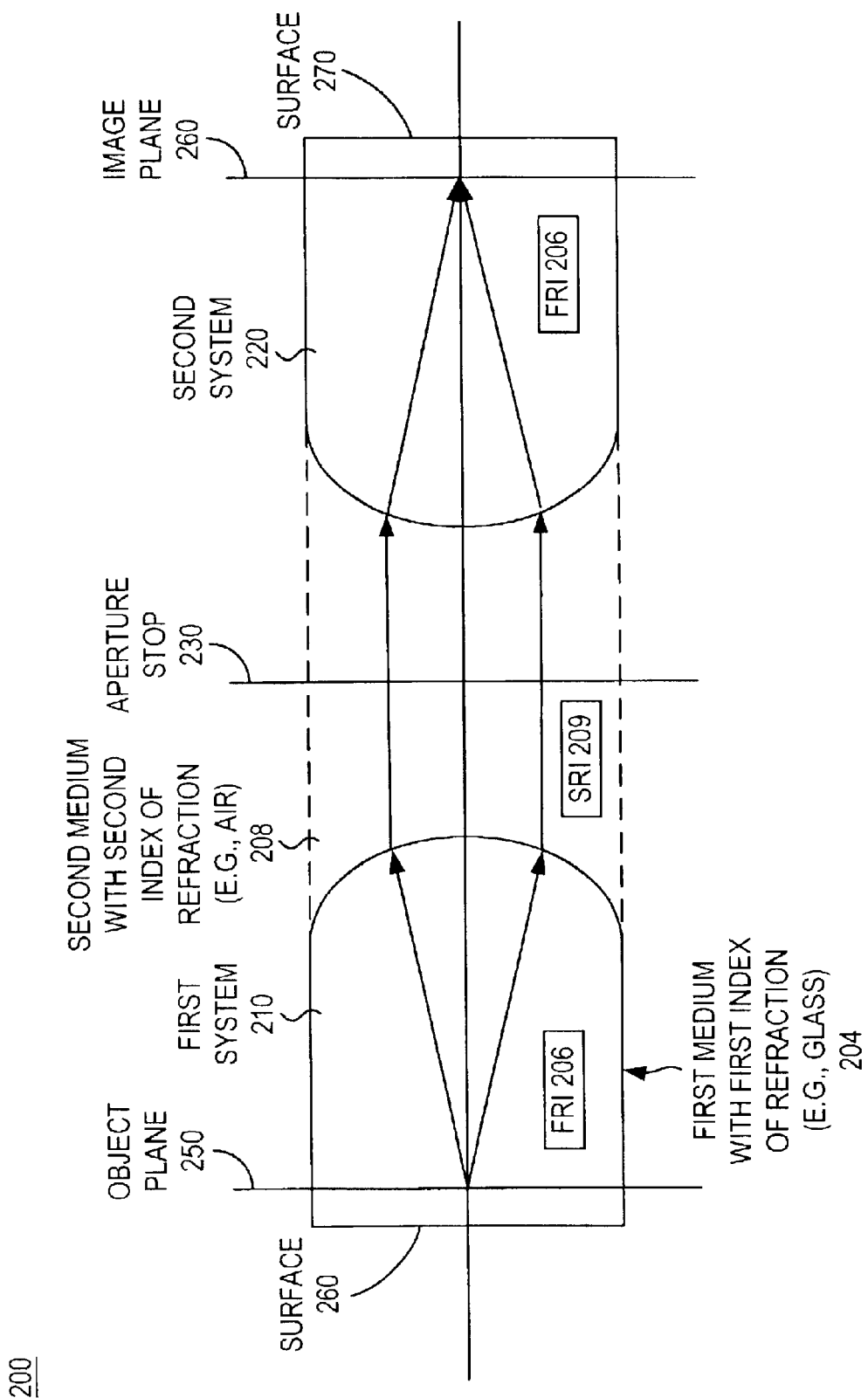
FIG. 2 illustrates a lens structure according to another embodiment of the present invention in which the first refractive medium is manufactured as two separate pieces.

FIG. 2 illustrates a lens structure 200 according to another embodiment of the present invention in which the first refractive medium 204 is manufactured as two separate systems (e.g., a first system 210 and a second system 220). Manufacturing the lens structure according to the invention as a single glass lens that contains the embedded stop in air is complicated as discussed previously. However, the manufacturing process for the lens structure 200 according to the invention can be simplified when the lens structure 200 is built or manufactured as separate pieces.

In this embodiment, the first medium or material 204 has a first refractive index (FRI) 206 (e.g., n=1.5) and includes a first portion 210 (hereinafter also referred to as a first system) and a second portion 220 (hereinafter also referred to as a second system). The first system 210 and the second system 220 can be implemented, for example, with two pieces of glass, plastic, metal, or other material.

The lens structure 200 of the present invention also includes an aperture stop 230 (e.g., an embedded or internal aperture stop). According to the invention, the aperture stop 230 is disposed in a second medium 208 that has a second refractive index (SRI) 209 that is less than the first refractive index (FRI) 206. For example, the second medium 208 can be air with a refractive index (n) equal to 1.0. In this embodiment, the aperture stop 230 may be positioned in air between two systems (e.g., two glass systems or objects).

One advantage of this embodiment over the first embodiment of FIG. 1 is that by separating the first medium 204 into two portions (e.g., 210, 220), the process for manufacturing the lens structure 200 is simplified. For example, the separate parts 210, 220, and 230 can be molded as individual parts. In addition to the optical features shown in FIG. 2, the lens structure can include or incorporate mechanical features that are well known in the art for holding the separate parts in correct position and alignment. The separate parts, for example, could be designed mechanically so as to snap together into a single assembly. Such methods are well-known in the plastic optics molding art.

In this embodiment, the object plane 250 is disposed in the first system 210 and the image plane 260 is disposed in the second system 220. Although in this embodiment, both the object plane 250 and the image plane 260 are disposed inside the media (e.g., the first system 210 and the second system 220), the lens structure 200 according to the invention can be designed or arranged to have the object plane 250 disposed on a surface (e.g., surface 260) of the first system 210, outside the first system 210, or inside the first system 210 (as shown in FIG. 2). Similarly, the lens structure 200 can be designed or arranged to have the image plane 260 disposed on a surface (e.g., surface 270) of the second system 220, outside the second system 220, or inside the second system 220 (as shown in FIG. 2).

It is noted that the lens structure 200 can be designed with any combination of the placements of the object plane 250 with respect to the first system 210 and placements of the image plane 260 with respect to the second system 220 described previously.

In one embodiment, object plane 250 is disposed on a surface 260, and the image plane 260 is disposed on another surface 270. This embodiment may be utilized in a situation that requires the placement an object in contact with an input surface (e.g., surface 260), and sensing the image at an output surface (e.g., surface 270). An application where the lens structure according to this embodiment may be advantageously employed is a fingerprint reader that is described in greater detail hereinafter with reference to FIG. 3.

Air Lens Structure 400

Figure 4:
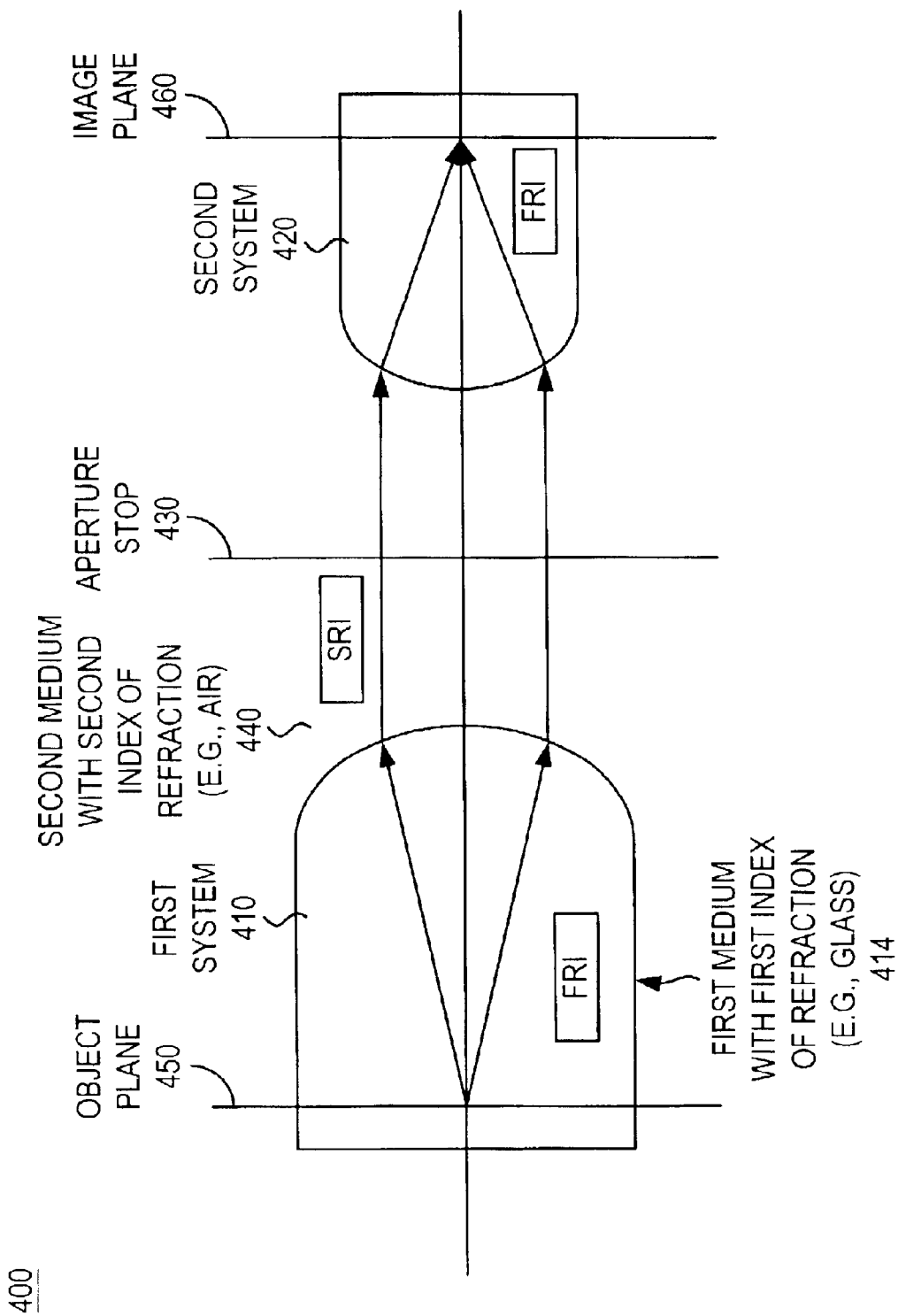
FIG. 4 illustrates a lens structure according to another embodiment of the present invention in which a first system and a second system are scaled relative to each other.
Figure 5:
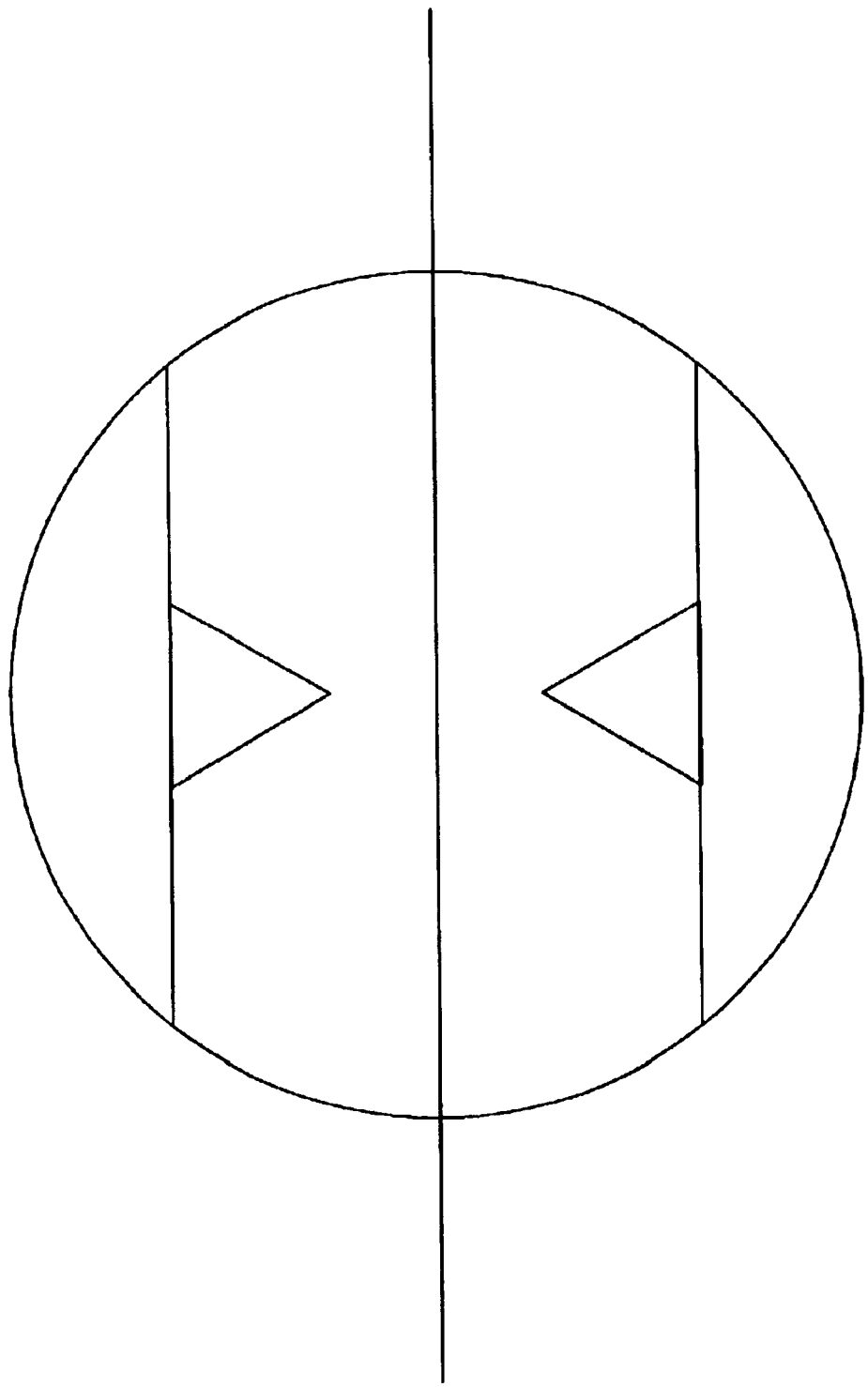
FIG. 5 illustrates a cross section of a prior art Coddington magnifier lens.

FIG. 4 illustrates a lens structure 400 according to another embodiment of the present invention in which a first system and a second system are scaled relative to each other. The lens structure 400 includes a first portion 410 (hereinafter also referred to as a first system) and a second portion 420 (hereinafter also referred to as a second system). In this embodiment, the first system 410 and a second system 420 are scaled relative to each other. This embodiment is useful to retain the benefits of symmetry for cases where 1:1 imaging is not desired.

Referring to FIG. 4, we could make the thickness of first portion 410 be (S) times the thickness of the second portion 420. The radius of curvature of first portion 410 would then be (−S) times the radius of curvature of second portion 420. The negative sign indicates that the surfaces are of opposite curvature. The distance d1 from the surface of 410 to the aperture stop 430 would be made (S) times the distance d2 from the aperture stop 430 to the surface of 420. When the curved surfaces of 410 and 420 are not spherical, but are conic aspheres, the 'conic constant' (kappa K) would be the same for both 410 and 420 surfaces.

When the curved surfaces of 410 and 420 include even order polynomial sag terms, the coefficients of the polynomial terms would also be scaled appropriately. For a polynomial term, (Bn) x r^n, the generated sag due to this term at radius (S) x r on surface of 410 would need to be (S) x sag generated by the corresponding term (An) at radius, r, on the surface of 420. To achieve this requires that (Bn)=−(An)/(S)^(n−1).

Thus, for a scale factor (S)=3, we would have the following:

For n=2, (B2)=−(A2)/3

For n=4, (B4)=−(A4)/27

For n=6, (B6)=−(A6)/243 and so on.

The negative signs reflect the fact that the surfaces are of opposite curvature.

With this scaling, any ray passing through the center of the aperture stop strikes the surfaces of 410 and 420 at points which are also (S):1 ratio in off axis distance, and the two curved surfaces for 410 and 420 would be exactly parallel at the intersection point of the ray on the surfaces 410 and 420 and would refract identically, assuming that 410 and 420 are made of the same material.

The first system 410 and the second system 420 are made from a first medium 414 or material with a first refractive index (FRI). For example, first system 410 and the second system 420 can be made from glass, which has a refractive index of n=1.5. The lens structure 400 according to the invention includes an aperture stop 430 that is embedded or disposed in a second medium 440 or material with a second refractive index (SRI), which is preferably air.

In this embodiment, the object plane 450 is disposed in the first system 410 and the image plane 460 is disposed in the second system 420. Although in this embodiment, both the object plane 450 and the image plane 460 are shown to be disposed inside the media (e.g., glass media), the lens structure according to the invention can be designed or arranged to have the object plane 450 and the image plane disposed either on the surface of the medium (e.g., the non-curved surface of the medium), inside the medium, or outside the medium or any combination thereof, to suit the requirements of a particular application.

Fingerprint Reader 300

Figure 3:
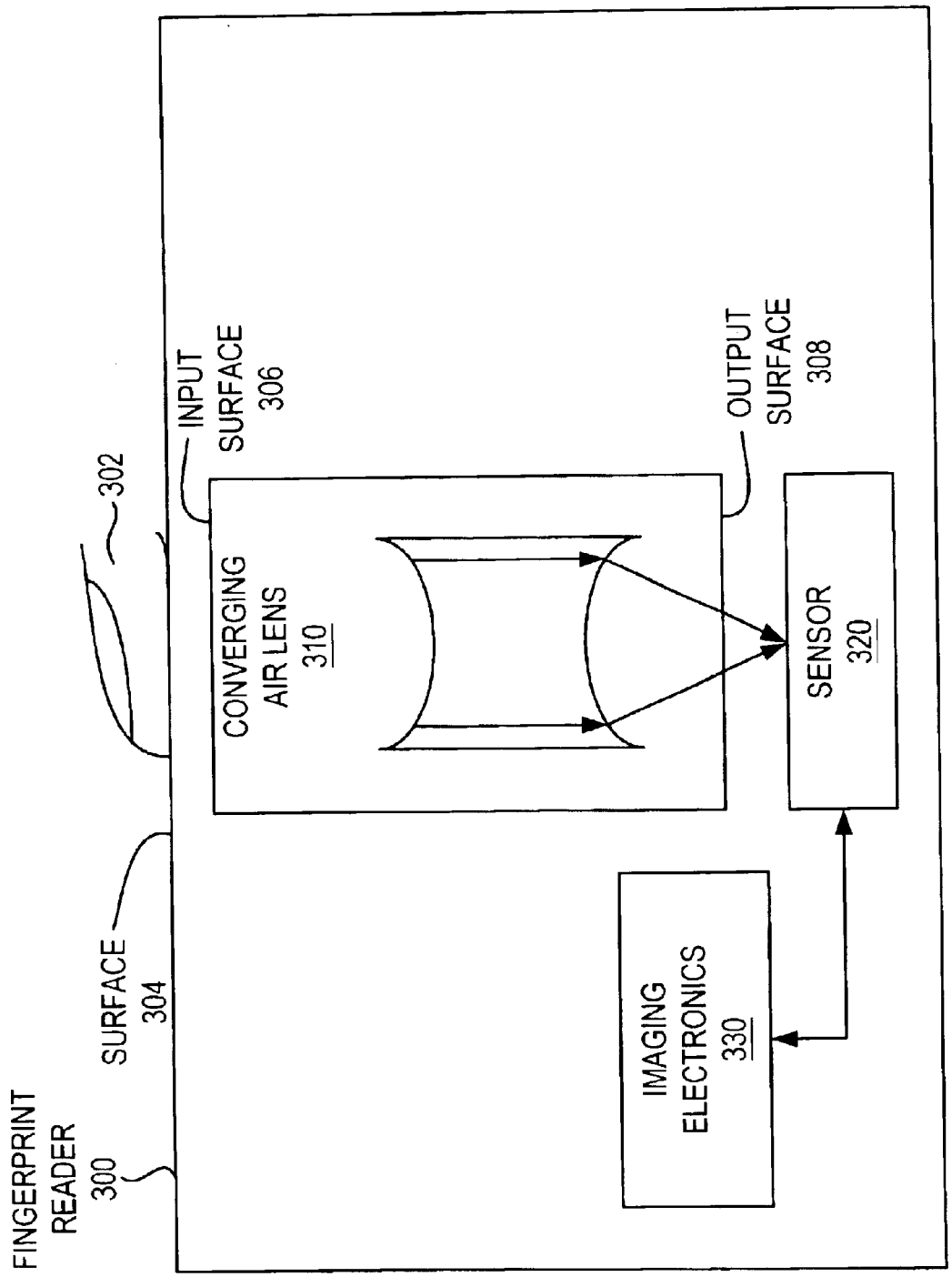
FIG. 3 illustrates a fingerprint reader that employs the inverted air lens according to one embodiment of the present invention.

FIG. 3 illustrates a fingerprint reader 300 that employs the inverted air lens 310 according to one embodiment of the present invention. The fingerprint reader 300 includes a sensor 320 for converting light signals received by the sensor 320 into corresponding electrical signals that represent the fingerprint. The fingerprint reader 300 also includes imaging electronics 330 for performing image processing on the received image. The fingerprint reader 300 also includes a converging air lens 310 according to the invention. The converging air lens 310 includes an input surface 306 and an output surface 308.

A finger 302 to be imaged is placed in contact with a surface 304. Suitable illumination is provided through the input surface 306 of the converging air lens 310, which can be made, for example, from glass or plastic. An output surface 308 of the converging air lens 310 can be optically coupled to the surface of the sensor 320 (e.g., surface of a digital camera sensor chip). For example, the surface of the sensor 320 can be cemented to the output surface 308 of the converging air lens 310.

In particularly advantageous in this application because of the following reasons:

1) The optical path from object (finger) to the air lens can be folded if desired using mirror surfaces to achieve some desired packaging configuration and likewise the path from the air lens to the image can be folded with mirrors; not necessarily in the same manner as the former.

2) Additional functions, such as external illumination, can be built into the part through other surfaces in the folded parts.

3) The separate parts including aperture stop can be mechanically designed to snap together into a single assembly.

The lens structures according to the invention achieve certain optical advantages because of its special geometry and symmetry. The symmetry stems from the ability to use an "embedded stop" that is embedded in the "air lens" (i.e., the air medium). For example, because the lens structures according to the invention are symmetrical about the aperture stop, the lens structures have certain benefits in the correction of some off axis aberrations.

Although the lens structure of the invention has been described by the various embodiments shown in FIGS. 1, 2, and 4, other arrangements can be devised in accordance with the teachings of the invention to realize other lens structures that include a low index lens immersed in a higher index refractive medium to yield converging lens properties.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A lens structure comprising:
a first refractive medium that has a first index of refraction;
a second refractive medium immersed in the first refractive medium; wherein
the second refractive medium has a second index of refraction of 1.0;
wherein the first index of refraction is greater than the second index of refraction;
wherein the lens structure features converging lens properties.

2. The lens structure of claim 1 further comprising:
an aperture stop disposed in the second refractive medium.

3. The lens structure of claim 1 wherein the first refractive medium has an index of refraction of 1.5.

4. The lens structure of claim 1 further comprising:
an object plane that is disposed in the first refractive medium; and
an image plane that is one of disposed in the first refractive medium, disposed outside of the first refractive medium, and disposed on a surface of the first refractive medium.

5. The lens structure of claim 1 further comprising:
an object plane that is disposed on a first surface of the first refractive medium; and
an image plane that is one of disposed in the first refractive medium, disposed outside of the first refractive medium, and disposed on a second surface of the first refractive medium.

6. The lens structure of claim 1 further comprising:
an object plane that is disposed outside of the first refractive medium; and
an image plane that is one of disposed in the first refractive medium, disposed outside of the first refractive medium, and disposed on a surface of the first refractive medium.

7. The lens structure of claim 1 wherein the first refractive medium includes a first portion and a second portion; and
wherein the first portion and the second portion are manufactured as separate pieces.

8. A lens structure comprising:
a first portion that has a first index of refraction;
a second portion that has the first index of refraction; and
a third portion positioned between the first portion and the second portion;
wherein the stop of the lens structure is disposed in the a third portion
wherein the first portion, second portion and third portion form a single lens.

9. The lens structure of claim 8 wherein the lens structure includes an embedded stop.

10. The lens structure of claim 9 wherein the embedded stop is disposed in the third portion that has a refractive index that is less than the first index of refraction.

11. The lens structure of claim 9 wherein the embedded stop is disposed in air.

12. The lens structure of claim 8 wherein the first portion and second portion each includes a refractive medium that is one of glass and molded plastic.

13. The lens structure of claim 8 wherein the first portion is scaled relative to the second portion in a 1:1 manner; wherein the output image of the first portion and the output image of the second portion have the same size.

14. The lens structure of claim 8 wherein the first portion is scaled relative to the second portion to obtain a 1:n image magnification or reduction.

15. The lens structure of claim 8 wherein the first portion is arranged to be symmetric to the second portion about the stop.

16. The lens structure of claim 8 wherein the arrangement of the first portion and the second portion are arranged to be symmetric about the stop corrects at least one off-axis aberrations.

17. The lens structure of claim 8 wherein the lens structure is a biconcave low index air lens immersed in a medium that has an index of refraction that is higher that the index of refraction of air.

18. The lens structure of claim 8 wherein the lens structure behaves as a converging lens.

19. A lens structure comprising:
a refractive medium that has a first index of refraction;
a lens immersed in the refractive medium; wherein the lens has a second index of refraction of 1.0; wherein the first index of refraction is greater than the second index of refraction;
wherein the lens structure features converging lens properties.

20. The lens structure of claim 19 wherein the first refractive medium has an index of refraction of 1.5.

* * * * *